(12) United States Patent
Yanagisawa et al.

(10) Patent No.: US 7,155,031 B2
(45) Date of Patent: Dec. 26, 2006

(54) MOVING OBJECT DETECTION METHOD (75) Inventors: Toshifumi Yanagisawa, Tokyo (JP); Atsushi Nakajima, Tokyo (JP); Takeo Kimura, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 829 days.

(21) Appl. No.: 10/424,725

(22) Filed: Apr. 29, 2003

(65) Prior Publication Data
US 2003/0202682 A1 Oct. 30, 2003

(30) Foreign Application Priority Data
Apr. 30, 2002 (JP) ............................. 2002-129342

(51) Int. Cl.
*G06K 9/00* (2006.01)
(52) U.S. Cl. .................. 382/103; 382/151; 33/268; 356/139.01; 359/430
(58) Field of Classification Search ................ 382/103, 382/107, 151, 312; 33/227, 268, 628; 340/815.4, 340/999; 701/13, 226, 222; 356/139.01; 359/430; 244/171, 3.16; 250/203.3, 203.6, 250/206.2
See application file for complete search history.

(56) References Cited

U.S. PATENT DOCUMENTS

| | | | | |
|---|---|---|---|---|
| 4,580,894 A | * | 4/1986 | Wojcik | .................. 356/28 |
| 5,365,269 A | * | 11/1994 | Holmes et al. | ............. 348/297 |
| 5,414,474 A | * | 5/1995 | Kamada et al. | ............. 348/700 |
| 5,525,793 A | * | 6/1996 | Holmes et al. | .......... 250/203.6 |
| 5,877,809 A | * | 3/1999 | Omata et al. | ................ 348/345 |
| 6,023,291 A | * | 2/2000 | Kamel et al. | ................ 348/147 |
| 6,133,997 A | * | 10/2000 | Yamawaki et al. | .... 356/139.01 |

OTHER PUBLICATIONS

T. Pauwels, "A New Method for Astrometric Observations of Asteroids"; *Asteroids, Comets, Meteors 1991*; pp. 455-458; 1992.
D. Rabinowitz; "Detection of Earth-Approaching Asteroids in Near Real Time"; *The Astronomical Journal*; vol. 101, No. 4; pp. 1518-1559; Apr. 1991.
A. Nakajima et al.; "Space Debris Observation by Ground-Based Optical Telescopes"; *Japan Society for Aeronautical And Space Sciences and ISTS*; pp. 2055-2060; 2000.

* cited by examiner

*Primary Examiner*—Sheela Chawan
(74) *Attorney, Agent, or Firm*—Westerman, Hattori, Daniels & Adrian, LLP.

(57) ABSTRACT

From a plurality of pictures 1-1 through 1-3 captured at successive time intervals, pictures 2-1 through 2-3 of regions determined in accordance with the movement of the celestial object are cut out. By deriving median values in regard to the same pixels in each of the cut-out pictures 2-1 through 2-3, a median value picture 3-1 is created. By deriving median values, the influence of large numbers of fixed starts that hinder the detection of the moving celestial object that moves in the cut-out pictures is eliminated, and only the moving celestial object is permitted to remain. When deriving median value, pixel values indicating singular values are eliminated in advance, so that the effects of the images of large bright light sources and the lost pixels that output no pixel values are effectively reduced. Further, when an average value picture is created using a plurality of median value pictures previously obtained, the detection limit increases and a dark moving celestial object that cannot be detected using a single observation picture can be extracted.

7 Claims, 8 Drawing Sheets

OBSERVATION PICTURES

FIG. 4-B

OBSERVATION PICTURES

MOVING OBJECT DETECTION METHOD

BACKGROUND OF THE INVENTION

1. Field of the Invention

The present invention relates to a method for detecting a moving object (a moving celestial object such as a man-made celestial object, space debris, an asteroid, a comet and the like), and relates in particular to a moving object detection method for (1) monitoring a man-made celestial object such as a small, dark man-made satellite, etc., and determining the orbit thereof, (2) discovering space debris that could cause major harm to industry if it collided with an operating man-made satellite or the like, and determining the orbit thereof, or (3) discovering at an early stage an asteroid or comet that could, in the event of a collision with Earth, have a serious impact on human industrial activities, or on the very existence of the human race, and determining the orbit thereof.

2. Description of the Related Art

Figure 8:
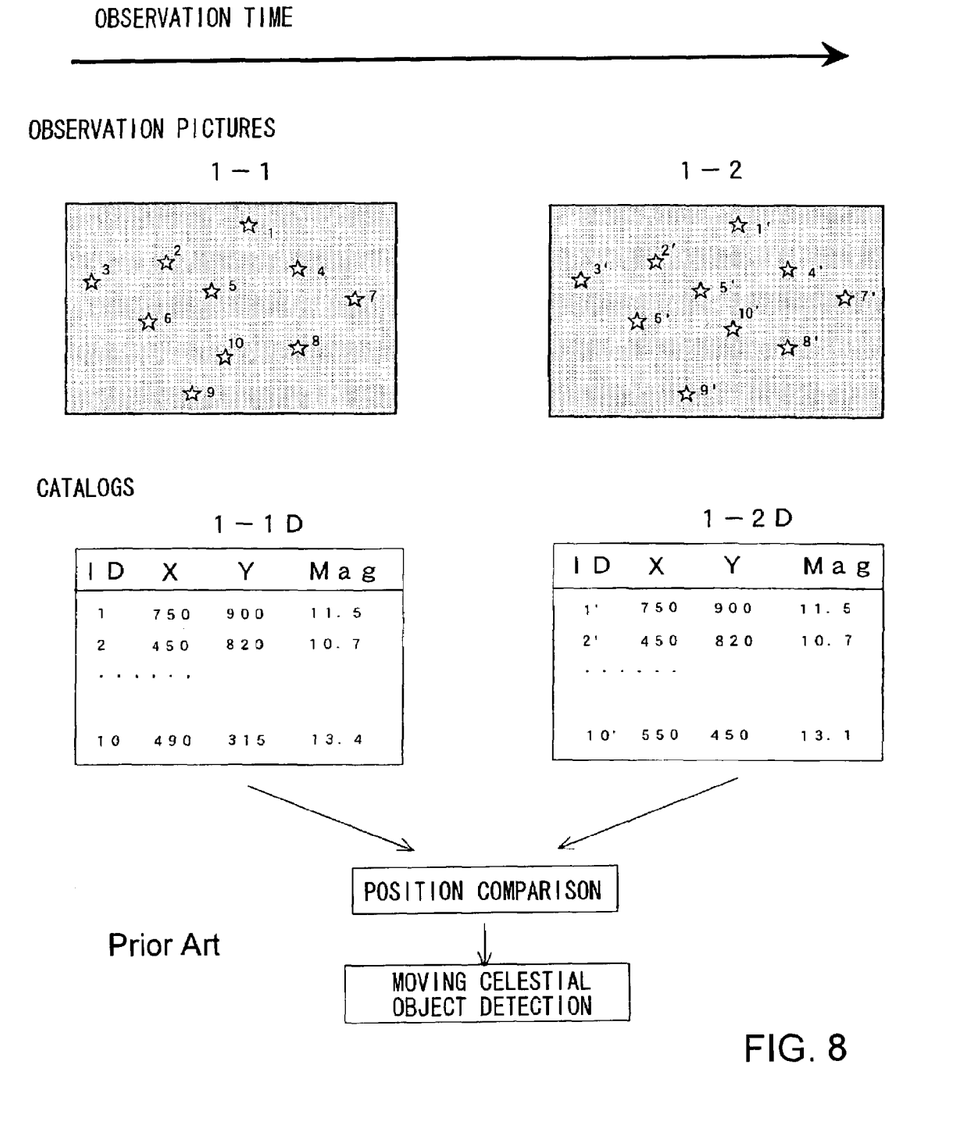
FIG. 8 is a drawing to explain the conventional method for detecting a moving celestial object.

FIG. 8 is a drawing to explain the conventional method for detecting a moving celestial object. The observation pictures (1-1) and (1-2) in FIG. 8 are pictures of the same celestial region in time over a certain time interval in the order of (1-1), (1-2). The objects 1 through 9 in the picture (1-1) and the objects 1' through 9' in the picture (1-2) are images of fixed stars, and the respective objects 1 and 1', 2 and 2' and so on up to 9 and 9' represent the same fixed stars. The object 10 in picture (1-1) and 10' in picture (1-2) represent a moving celestial object, and it can be seen that such object has moved in the sky during the image capture interval.

In the conventional moving celestial object detection method, two pictures obtained through image capture are analyzed, and the celestial objects that are reproduced in both pictures are identified and catalogued (see the catalogs (1-1D) and (1-2D) in FIG. 8). The catalogs contain such information as the position and brightness ('Mag') of the celestial objects 1 through 10 and 1' through 10', respectively. By comparing these two catalogs and detecting a pair of celestial objects that do not exist in the same position in the two pictures, the moving celestial object 10, 10' can be determined to exist.

Incidentally, in recent years, as CCDs have become larger, the amount of sky that can be observed in one image capture session has increased dramatically. As a result, while the probability of locating a moving celestial object has increased, the number of fixed stars, which amount to noise insofar as moving celestial object detection is concerned, has also increased, and now number in the several tens of thousands. Detecting moving celestial objects in the midst of this large background of noise is extremely difficult. Moreover, because a moving celestial object moves in the pictures, sufficient results cannot be obtained when a dark moving celestial object is to be detected, even when using a fixed star observation technology in which the exposure period is lengthened so that the light from a celestial object is accumulated at a fixed position in the picture.

The effective exposure period is the period during which the moving celestial object remains at one point on the image, and the limiting magnitude is determined by the diameter of the telescope used for observation and the quantum efficiency of the CCD.

The inventors have already suggested a method that removes the images of large bright light sources that hinder the detection of a moving object which moves in any direction and at any speed and can be detected with an observation system that has been used, by using a plurality of pictures and enables detection of a moving object that is too dark to be detected with a single observation picture. With this method, a moving object that is too dark to be detected could apparently be detected by eliminating the effect of bright light sources such as fixed stars and suppressing the background noise by means of calculating the median values of each pixel value of cut-out pictures that were cut out from a plurality of images.

However, because the bright light sources (fixed stars) have a spread in the form of a central portion and peripheral portion thereof on the pictures and there is also a loss of pixels which do not return the pixel values and pictures of dark fixed stars, images of those stars produce a significant effect on calculation of median values of pixel values of cut-out pictures. Accordingly, there is still room for improvement in terms of reducing the effect of those stars and accurately and effectively detecting the dark moving bodies.

SUMMARY OF THE INVENTION

It is an object of the present invention to resolve the above-described problems and to provide a moving object detection method by which a moving object that moves in any direction and at any speed is detected by using a median value of each picture of a plurality of pictures obtained with an observation system (for example, a telescope and a CCD camera), wherein the effects of large bright light sources (in the case of celestial objects, fixed stars) that hinder the detection, dark fixed stars, and pixels that output no pixel values and were lost are effectively eliminated and a moving object that is too dark to be detected with a single observation picture can be effectively detected.

In order to attain the above object, the present invention provides a method for detecting from a plurality of observation pictures a moving object that moves on said observation pictures, comprising the steps of: postulating the movement of said moving object in at least three of said observation pictures; cutting out a part of said observation pictures in accordance with the postulated movement; creating median value pictures by the median values found based on pixel values within a certain range in which the singular values have been removed with respect to each pixel assuming the identical pixel position in the plurality of cut-out pictures; and obtaining pictures in which only the image of said moving object with the postulated movement was allowed to remain.

With the present invention, when median value pictures are created by using cut-out pictures matching the movement of a virtual moving object from a plurality of observation pictures, the median value pictures with a reduced effect of pixel values indicating singular values are created by eliminating in advance the images of large bright light sources (in the case of celestial objects, including the central portions of fixed stars and peripheral portions thereof), dark fixed stars, and pixels that output no pixel values and were lost when median values are calculated, the effects of the images of large bright light sources (in the case of celestial objects, fixed stars), dark pictures, and the lost pixels that output no pixel values, which serve as noise for moving object detection, are effectively eliminated and a moving object that is too dark to be caught with a single observation picture be effectively detected. Conducting such an image processing for removing singular values makes it possible to raise the detection limit of moving bodies and to reduce greatly the ratio of erroneous detection.

In such a method for detecting a moving body, the above-mentioned certain range can be set as a first range established based on the noise level of a background and having as a center thereof the median value of the background in the cut-out picture. By setting the first range, the effect of the central portions of bright stars and of pixels that return no pixel values can be reduced.

Furthermore, the certain range can be also set as a second range obtained as a narrow range which is narrower than the first range and is established by finding a median value and a standard deviation from the plurality of pixels having pixel values within the first range and establishing the narrow range based on the standard deviation about the median value as a center, or as an even narrower range that is obtained by repeating the operation of applying the technique for finding the aforesaid narrow range to a plurality of pixels having pixel values within the narrow range. Setting the second range makes it possible to reduce the effect of peripheral portions of bright stars and the effect of dark stars.

In this moving object detection method, an average value picture of the plurality of said median value pictures can be created, so that an image can be obtained in which only the image of the moving object for which the movement was postulated is permitted to remain and emphasized. In other words, a dark moving object that cannot be detected using a single observation picture can be detected by substantially reducing the ratio of noise to the amount of light from the moving object.

In this moving object detection method, the postulated movement of the moving object can be deemed movement having any type of direction and speed that can be detected using the observation system used in such method, and in this way, many dark moving objects that move in the observation pictures can be detected.

In this moving object detection method, by making the observation area a celestial region, a moving celestial object such as a man-made celestial object, space debris, an asteroid or a comet can be detected as the moving object. While the images of fixed stars appear in large numbers as bright light sources in the observation pictures of the celestial region, using this detection method, the numerous images of fixed stars, which severely hinder the detection of the moving celestial object, can be completely eliminated, lowering the limiting magnitude of the moving celestial objects so as to make it possible to detect more darker celestial objects, and only the images of the moving celestial object can be permitted to remain, or can be emphasized to reduce greatly the ratio of erroneous detection.

Furthermore, by performing the processing pertaining to the present invention with regard to each of many moving celestial objects, not only the moving object being observed but also other celestial objects moving in a fashion similar to the observed celestial object can be detected. In addition, such effects of the moving objects can also be emphasized via average value processing, and by combining the many pictures obtained through this process, dark moving objects that fall below the limiting magnitude of an observation system that cannot identify such objects using conventional detection methods can be identified automatically.

This method will contribute significantly to the discovery and orbital determination of space debris having a diameter ranging from several centimeters to several tens centimeters, which is difficult to detect at present and which could seriously harm operating man-made satellites and the international space station currently under construction. It will also enable the early-stage discovery of asteroids and comets having a diameter ranging between several hundred meters and one kilometer that in the event of a collision with Earth would affect human activity and even put the very survival of the human race at risk.

In this moving object detection method, the observation pictures can be deemed pictures captured of the same observation region using as an observation system a CCD camera, a technology that has become quite sophisticated in recent years.

These and other objects and characteristics pertaining to this invention will be made clear in the description provided below with reference to the accompanying drawings, as well as in the claims.

DESCRIPTION OF THE PREFERRED EMBODIMENTS

The present invention enables the detection of a moving object that move in any direction and at any speed and is too dark to be detected using a single observation picture, by using a plurality of captured observation pictures via the observation system employed (such as a telescope or CCD camera) and eliminating images of bright light sources that exist in large numbers and hinder the detection of the moving object. In the embodiments described below, the processing sequence executed when the moving object detection operation based on the present invention is carried out in order to detect a dark moving object in a celestial region deemed the observation area is explained. This processing sequence is divided principally into three steps:

(1) Estimate beforehand the movement of the moving celestial object, create a median value picture of a plurality of observation pictures, and eliminate the images of fixed stars that hinder the detection of the moving celestial object;

(2) Create a plurality of median value pictures using the processing step described in paragraph (1) above, create an average value picture from these median value pictures, and extract the dark moving celestial object that cannot be detected from a single observation picture; and (3) Execute the processing steps of paragraphs (1) and (2) for various possible movements of moving celestial objects.

The processing steps (1) through (3) above will now be explained with reference to the drawings.

The processing step (1) above pertains to one embodiment of the present invention, and creates median value pictures of a plurality of observation pictures and eliminates images of fixed stars that hinder the detection of the moving celestial object.

Figure 1:
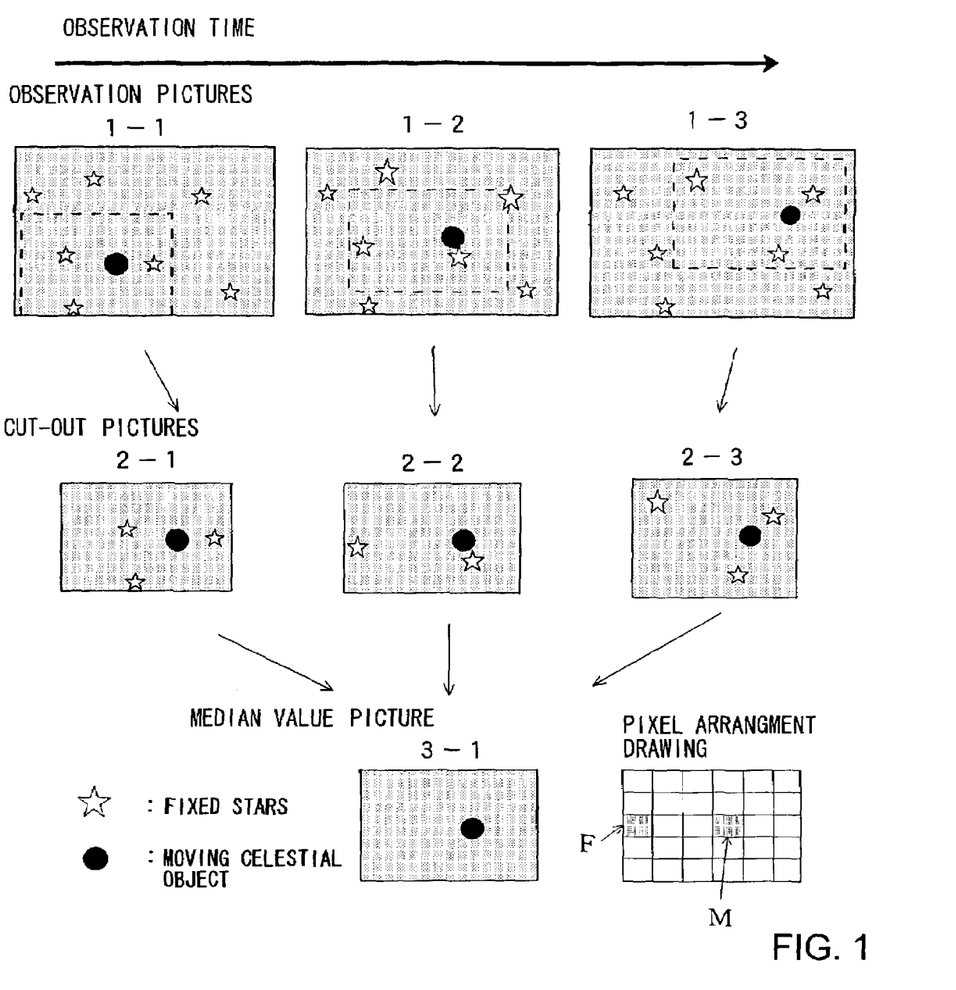
FIG. 1 is a basic conceptual drawing to explain the manner in which the images of fixed stars are eliminated through the creation of a median value picture pertaining to the present invention.

In the processing step (1) in which images of fixed tars are eliminated through the creation of median value pictures, first, as shown in FIG. 1, the pictures 1-1, 1-2 and 1-3, which are observation pictures of the same region, are captured at certain time intervals in numerical order as shown on the time axis. In the pictures 1-1 through 1-3, the star symbols represent fixed stars and the black circle symbol represents a moving celestial object. The movement of the moving celestial object is postulated.

Next, the pictures 2-1, 2-2 and 2-3 of the regions matching the movement of the postulated moving celestial object in the plurality of pictures 1-1 through 1-3 captured at certain time intervals (the regions surrounded by the dashed lines in the drawing) are cut out from such multiple pictures. In case where an actual celestial object happens to move just as the postulated object, in all of the pictures 2-1 through 2-3, the moving celestial object exists in the same position, but the positions of the fixed stars are different in each picture.

A median value picture 3-1 is then created by deriving a median value with respect to each pixel in each of the cut-out pictures 2-1 through 2-3. While the average value is a value that takes equally into account the values of the pixel in all of the cut-out pictures, the median value is a value wherein values regarding the observed pixel in all of the cut-out pictures are arranged in numerical order and the value positioned in the center of these values is selected as data, and is a value that has no relationship to a pixel value comprising a specific value (i.e., a value corresponding to a bright fixed star). In other words, by deriving the median value, the influence of the singular values can be reduced (i.e. the effects of the fixed star images are eliminated). Moreover, the background noise can be greatly reduced (the background noise decreases with the one-halve power of the number of pictures used).

In the pixel arrangement drawing of FIG. 1 showing the pixel arrangement for the cut-out pictures, one box represents one pixel. Let us focus our attention on the pixels located at the pixel positions F and M, for example, in each picture 2-1 through 2-3. For the sake of simplification, the pixels in which a celestial object exists will be assigned a pixel value of '1', and the pixels in which a celestial object does not exist will be assigned a value of '0'. In the cut-out pictures 2-1 through 2-3, a fixed star exists in the pixel corresponding to the position F in the picture 2-2. In other words, the pixel values for the position F in the respective drawings are '0', '1' and '0', and the median value is '0'.

On the other hand, a moving celestial object exists in the pixel corresponding to the position M in each of the cut-out pictures. In other words, the pixel values at the position M are '1', '1' and '1', and the median value is '1'. By deriving a median value, the influence of the fixed stars moving in the cut-out pictures is eliminated, and only the moving celestial object can be permitted to remain.

In the example described in connection with this embodiment, three observation pictures 1-1 through 1-3 were used in order to create the median value picture 3-1, but the number of observation pictures used varies depending on the number of fixed stars that amount to image noise. Where many fixed stars are included in the picture, in order to eliminate their influence, it is necessary to create a median value picture using a larger number of pictures.

The processing step (2) pertains to an embodiment that realizes the next step of the present invention. In this processing step, an average value picture is created using a plurality of median value pictures obtained through the processing step (1), enabling the extraction of a dark moving celestial object that cannot be detected using a single observation picture.

Figure 2:
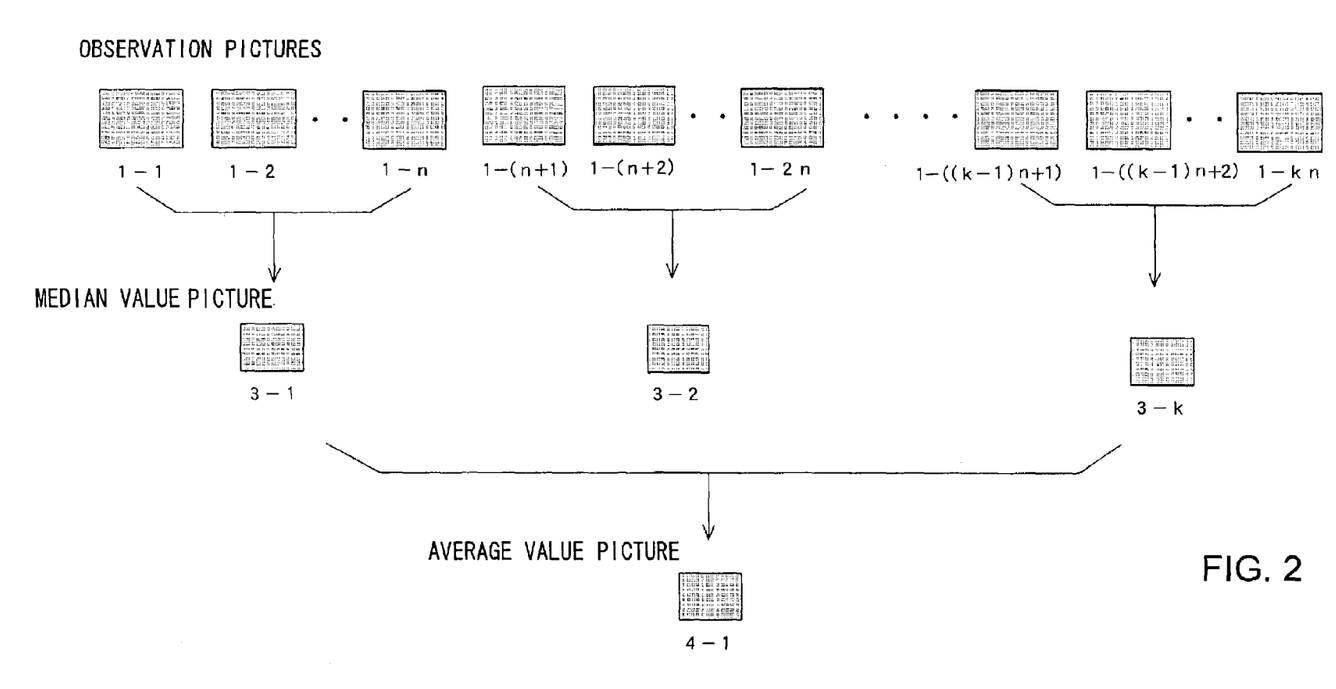
FIG. 2 is a drawing showing the processing sequence executed up to the point at which the average value picture pertaining to the present invention is created.

FIG. 2 is a drawing to explain the processing step (2) up to the point at which an average value picture is created. By deriving median values in the processing step (1), the influence of fixed stars is eliminated, and in addition to this influence, the influence of background noise from brightness in the night sky other than that due to fixed stars is also reduced, enabling the dark moving celestial object to be detected. Here, where the value of the background noise when the median values are derived (the background noise in the median value picture) is deemed σm, σm is represented by the following equation (1).

$$\sigma_m = \frac{1.2}{\sqrt{n}} \sigma_i \quad (1)$$

Here, σi is the background noise for one observation picture, the coefficient 1.2 is a statistically derived value, and (n) is the number of observation pictures used to create the median value picture.

However, in general, the average value is more effective in suppressing background noise than the median value. Where the value of the background noise when the average values are derived (the background noise in the average value picture) is deemed σa, σa is represented by the following equation (2).

$$\sigma_a = \frac{1}{\sqrt{n}} \sigma_i \quad (2)$$

As can be seen from the equations (1) and (2) above, when the average value picture is created, a moving celestial object having a darkness equivalent to 1.2 times compared with the case of the median value picture can be detected.

In this embodiment, in order to further increase the detection limit, the influence of fixed stars is eliminated by creating median value pictures 3-1, 3-2, . . . , 3-k from the plurality of observation pictures based on the processing step (1) pertaining to the previous embodiment, and in order to detect a darker moving celestial object, an average value picture 4-1 is subsequently created from the created plurality of median value pictures 3-1 through 3-k. In other words, in the average value picture 4-1, regarding parts in which a moving celestial object does not exist even if some of the images are bright, the average value image becomes dark, while regarding parts in which a moving celestial object does exist, because an average is taken of the images in which the moving celestial object always exists, such parts are brightened relative to the parts in which a moving celestial object does not exist.

In order to more effectively detect a dark moving celestial object in this embodiment, it is preferred that the effects of the central and peripheral portions of bright stars for which an singular value exists, of dark fixed stars, and of pixels that do not return a value due to pixel loss, be reduced in calculating the median values for each pixel when the above median value pictures are found. The processing aimed at maximum possible removal of pixels having this negative effect is conducted in accordance with the flow chart shown in FIG. 6. In this processing, first, the median value of the backgrounds of the cut-out pictures is found (step 1, abbreviated as "S1", similar abbreviations are used hereinbelow). For identical pixels (the pixels at the same pixel positions) in all the cut-out pictures, it is decided as to whether or not the absolute value of the difference between the pixel value Ii and the background median value C1 found in step S1 is less than a certain multiple of the background noise level (standard deviation $\sigma m$). Only pixels having values within this range (first range W1) are used, and pixels having values outside this range are ignored (S2). The standard deviation $\sigma m$ is found from the equation (1) based on the number of cut-out pictures (n). Based on experience and in order to simplify calculation, it is preferred that this multiple be, for example, a multiple of eight. Through the processing of S1 and S2, when median values are calculated, central portions of bright stars and values of pixels that do not return a value due to pixel loss are eliminated in advance, and the effect of these abnormal values can be reduced.

Figure 6:
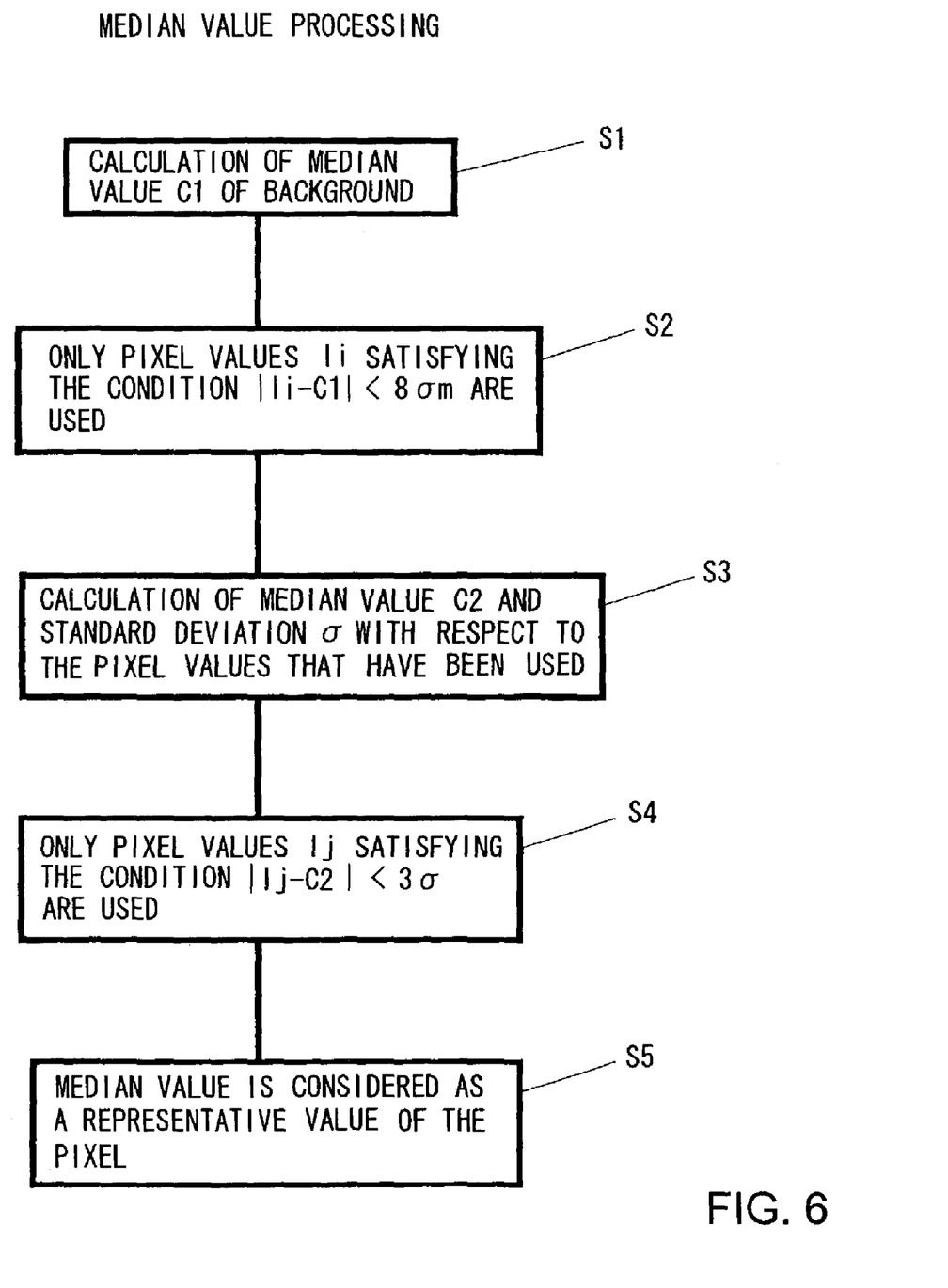
FIG. 6 is a flow chart illustrating processing which removes the pixel values indicating singular values when the median value pictures are found in the moving celestial object detection method in accordance with the present invention.

Then, the median value C2 and standard deviation ($\sigma$) are calculated for the remaining pixels (S3) and it is decided as to whether the absolute value of the difference between the pixel value Ij and the median value C2 is less than a certain multiple of the standard deviation ($\sigma$) (for example, a multiple of three; it must be less than the previous multiple). Only pixels are used that have values within a range (second range W2) having a spread of a certain multiple of the standard deviation on both sides of the median value, and pixels having values outside this range are ignored (S4). The operations of S3 and S4 are repeated until all the pixel values enter the second range W2. By repeating the processing of S3 and S4, the effect of the peripheral portions of bright stars and dark fixed stars can be reduced. The finally obtained median value is considered as the representative value of the pixels at that pixel position in the median value picture (S5). By conducting the above-described two-stage pixel value selection processing with respect to all the pixels in the cut-out pictures, a median value picture in which negative effects are eliminated can be obtained.

Figure 7:
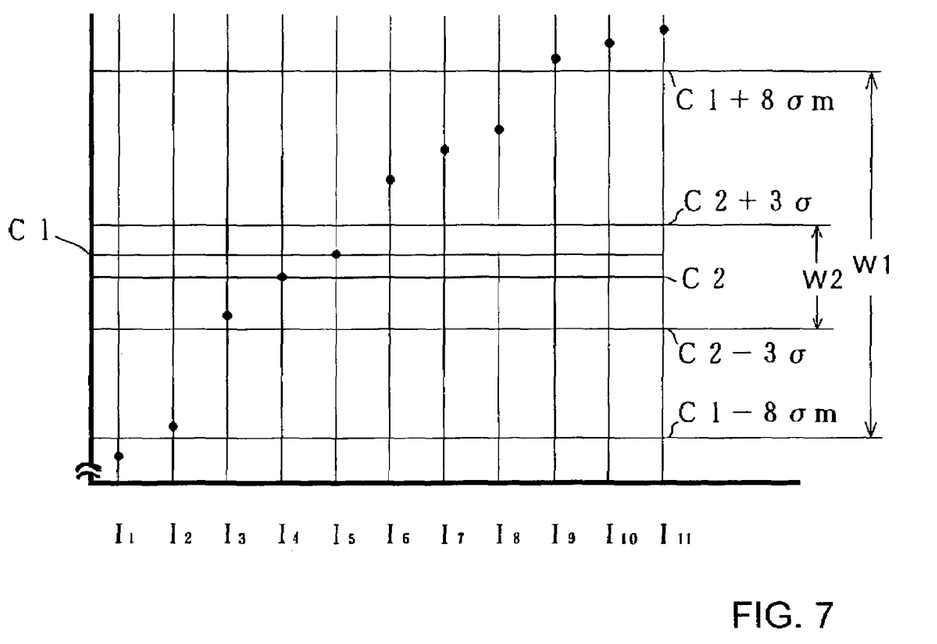
FIG. 7 illustrates the basic process for adopting/discarding and selecting the pixel values with the first and second ranges in the moving celestial object detection method in accordance with the present invention.

The basic process by which the pixel values are adopted or discarded via this two-stage pixel value selection processing is shown in FIG. 7. In FIG. 7, the number of cut-out pictures (n) is set at 11 as an example, and the pixel values of pixels at certain specific pixel positions are arranged in the order of the size thereof. The median value C1 is specified in S1 (pixel I6), and only the pixel values Ii (I2 to I8) within the first range W1 of 8 $\sigma m$ above and below the median value C1 are used in S2. Through this processing, extremely bright pixel values such as the central portions of bright stars and pixel values for which a pixel value is not returned are eliminated. Next, in S3, the median value C2 (I5) and standard deviation ($\sigma$) relating to the used pixel values are found, and in S4 only the pixel values Ii (I3 to I5) within the second range W2 of 3 $\sigma m$ above and below the median value C2 are used, and the effect of peripheral portions of bright stars and dark fixed stars is eliminated. In S5, the pixel I4 is selected as the median value at this pixel position. Conducting such picture processing for removing singular values makes it possible to further raise the detection limit of movable celestial bodies in actual picture analysis and to reduce greatly the ratio of erroneous detection caused by the effect of fixed stars and the like.

The processing step (3) pertains to an embodiment that realizes the next step of the present invention. In this processing step, the tasks performed in the processing steps (1) and (2) above are executed with respect to all conceivable velocity vectors for a moving celestial object. In other words, because the above processes are performed assuming the existence of a moving celestial object, even if the movement of a moving celestial object is not known, by cutting out pictures pertaining to all conceivable velocity vectors of a moving celestial object and performing median value processing in connection therewith, or by further performing average value processing, when the cut-out vector, i.e., the direction and distance of the shift in the cut-out pictures, happens to match the velocity vector of a moving celestial object, i.e., the direction and distance of the movement of a moving celestial object, the existence of a moving celestial object can be identified.

Figure 3:
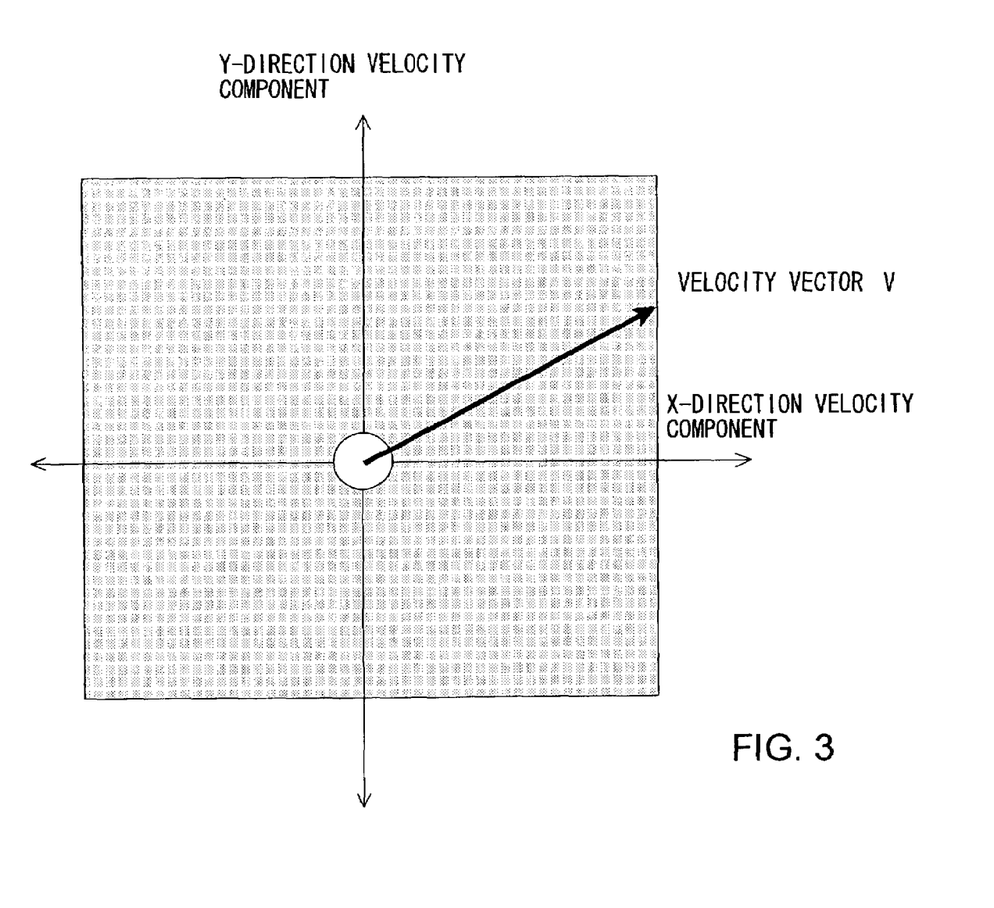
FIG. 3 is a drawing showing the velocity vector region for the moving celestial object to be scanned in the present invention.

FIG. 3 is a drawing showing the velocity vector region for a moving celestial object to be scanned in the processing step (3). The bold arrow is a velocity vector of a moving celestial object in the picture, the gray part enclosed by solid lines is a parameter region, and the X axis and Y axis indicate the two components of the velocity vector of the moving celestial object in the picture. The maximum value of the velocity component is determined by the size of the picture obtained by CCD and the number of pictures used.

The region near the point of origin in FIG. 3 is a region in which the elimination of fixed stars is not effectively performed because the amount of movement thereof is small. In other words, where the processing step (1) of the present invention is carried out on a moving celestial object that is moving in a fashion similar to a fixed star, fixed stars are not effectively eliminated.

The size of the cut-out picture is determined uniquely for each velocity vector V that is contained in the parameter region of FIG. 3.

Figure 4:
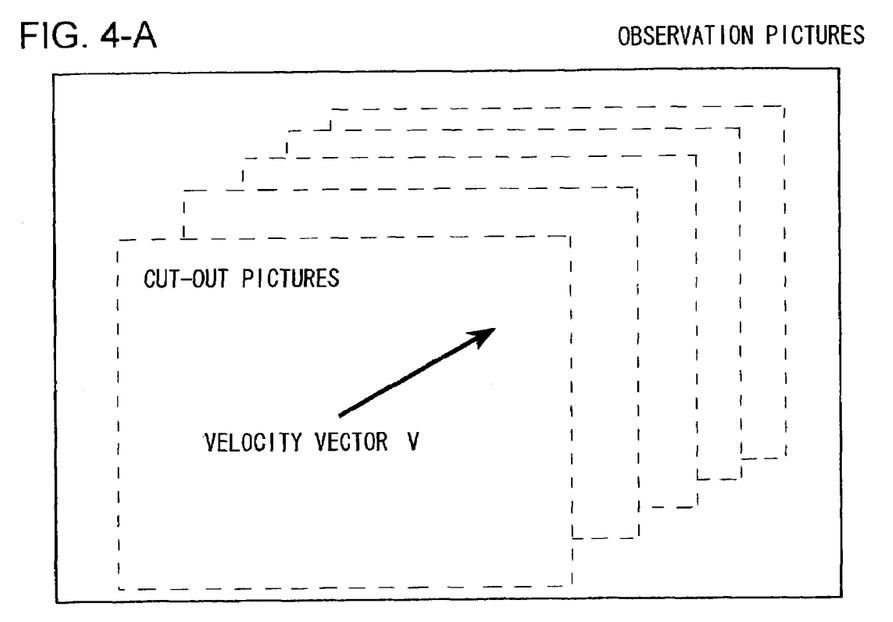
FIG. 4 is a drawing showing the difference in the sizes and the direction of movement of the cut-out pictures based on the differences between the velocity vectors for the moving celestial object.

FIG. 4 is a drawing showing the difference in the sizes and the direction of shift of the cut-out pictures based on the differences between the velocity vectors for a moving celestial object. The rectangle formed by the solid lines indicates the size of the observation picture obtained by the CCD camera, while the rectangles formed by the dashed lines indicate the sizes of the cut-out pictures. The bold arrow indicates the velocity vector V.

Where the absolute value of the velocity vector V is small, the area of each cut-out picture is large, as shown in FIG. 4-A, while where the absolute value of the velocity vector V is large, the area of each cut-out picture is small, as shown in FIG. 4-B. It can be seen from FIGS. 4-A and 4-B that moving celestial objects having a small amount of movement have a larger effective area in which detection can be performed.

By performing this processing for each of many moving celestial objects, both the celestial object being observed and other celestial objects traveling in a fashion similar to the celestial object being observed can be detected, and the images of such objects can be brightened via average value processing. By combining the many pictures obtained through this process, dark moving objects that cannot be identified using conventional methods can be detected.

EXAMPLE

Figure 5:
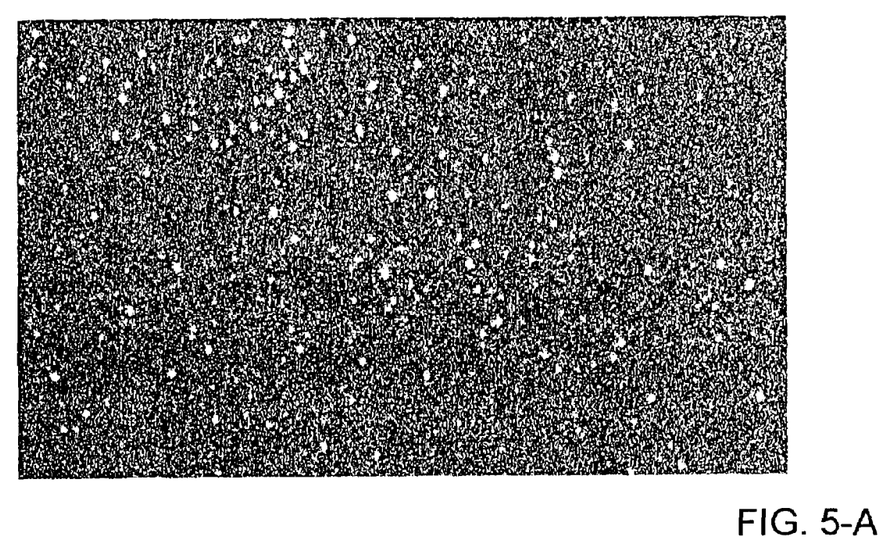
FIG. 5 is a drawing showing an example of the image obtained using the moving celestial object detection method pertaining to the present invention.

FIG. 5 is a drawing showing an example of the picture obtained using the moving celestial object detection method pertaining to the present invention.

In order to detect a satellite or piece of debris having a geosynchronous orbit, a CCD camera having a 3 cm×3 cm image area was mounted to a wide-angle telescope having a diameter of 50 cm and an F-value of 2.0, and the geosynchronous orbital region was continuously captured in thirty pictures in fixed star pursuit mode with an exposure time of 2 seconds and an exposure interval of 13 seconds. In fixed star pursuit mode, the movement of a celestial object in a geosynchronous orbit consists of eastward movement of approximately 15" per second. As a result, a region corresponding to this movement was cut out from each picture, and first, three median value pictures were created from 10 pictures each, and an average value picture was created from these three median value pictures.

FIG. 5-A is a picture cut out from a single observation picture in accordance with the movement of a geosynchronous celestial object. In the picture appear a large number of fixed stars, which constitute noise from the standpoint of moving celestial object detection. FIG. 5-B is a final picture created pursuant to the method of the present invention using 30 observation pictures.

A celestial object in a geosynchronous orbit is clearly identified in roughly the center of the picture. It can be seen that the fixed stars that constituted noise are almost completely eliminated, and the brightness of the detected celestial object in the geosynchronous orbit is brighter than in the case in which only a single observation picture is used. This demonstrates that a dark moving celestial object that cannot be detected using a single observation picture can be detected according to the present invention by first eliminating bright fixed stars that are unnecessary, and then by brightening via average value processing the moving celestial objects that are to be detected but relatively dark.

In the above-described moving object detection method, cutting out the pictures directly from each taken picture was explained. However, it is preferred that dark frames be deducted in advance from all the pictures in order to remove electronic noise inherent to CCD cameras with respect to several tens to several hundreds of pictures obtained by observations, and also that the preprocessing of dividing all the pictures by the flat field pictures be conducted to correct the difference in sensitivity between the CCD pixels.

Further, in the above-described moving object detection method, the moving celestial body was directly detected by the picture synthesis operation comprising the steps of cutting out the pictures, creating the median value pictures, and creating the mean value picture. However, it is preferred that pictures in a small region be cut out by slightly changing the amount of movement of the moving celestial body candidate that has been located and detected as a candidate of the moving celestial body obtained by the picture synthesis operation, the above-described picture synthesis operation be applied to the cut-out pictures of the small region, and examination be conducted of maximum values shown by the moving celestial body candidate when the amount of movement has been changed. The moving celestial body can be specified by assuming that the amount of movement for which the value of brightness shown by the moving celestial body candidate reaches maximum is a true amount of movement. Accurate coordinates and brightness of the specified moving celestial body at the beginning and end of observations can be found from the positional relationship and brightness relationship with the background stars.

The moving object detection method pertaining to the present invention was described above using as an example the detection of a moving celestial body with reference to the accompanying drawings, but the moving object detection method pertaining to the present invention may be applied in any other manner that does not depart from the spirit of the present invention. Thus, it can be applied to discover and determine the orbit of space debris that can collide with the operating artificial satellites, to determine the orbit of small satellites in the vicinity of stationary orbits which are difficult to detect optically with the presently available technology, but whose number will apparently increase in the future, and to discover rapidly and to determine the orbit of asteroids or comets that can collide with earth, greatly affecting the very existence of the mankind. Furthermore, examples of scientific applications include discovery of Edgeworth-Kuiper belt celestial bodies present on the outer edge of solar system, discovery of asteroids of several hundred meters in size that are present in asteroid belts, discovery of unknown comets, and the like. Such scientific applications are expected to make a significant contribution to obtaining new information relating to the solar system and origination thereof. It is clear to those skilled in the art that the moving object detection method pertaining to the present invention can be also employed, for example, for detecting a dark moving object that moves among a large number of bright light sources, so as to detect the movement of people or animals in the nighttime, and that it can be implemented upon modification of details, without departing from the spirit of the present invention.

What is claimed is:

1. A method for detecting from a plurality of observation pictures a moving object that moves on said observation pictures, comprising the steps of:

postulating the movement of said moving object in at least three of said observation pictures;

cutting out a part of said observation pictures in accordance with the postulated movement;

creating median value pictures by the median values found based on pixel values within a certain range in which the singular values have been removed with respect to each pixel assuming the identical pixel position in the plurality of cut-out pictures; and obtaining pictures in which only the image of said moving object with the postulated movement was allowed to remain.

2. The moving object detection method according to claim 1, wherein said certain range is a first range established based on the noise level of a background in said cut-out picture and having as a center thereof the median value of said background.

3. The moving object detection method according to claim 2, wherein said certain range is a second range obtained as a narrow range which is narrower than said first range and is established by finding a median value and a standard deviation from said plurality of pixels having said pixel values within said first range and establishing the narrow range based on said standard deviation about said median value as a center, or as an even narrower range that is obtained by repeating the operation of applying the technique for finding said narrow range to said plurality of pixels having said pixel values within said narrow range.

4. The moving object detection method according to claim 1, wherein such method includes the step of creating an average value picture from said plurality of median value pictures in order to obtain an image in which only the image of said moving object regarding which the movement was postulated is allowed to remain and is emphasized.

5. The moving object detection method according to claim 1, wherein said postulated movement of said moving object is movement having any direction and speed that can be detected by the observation system being used.

6. The moving object detection method according to claim 1, wherein said observation pictures are pictures of a celestial region, and said moving object is a moving celestial object such as a man-made celestial object, space debris, an asteroid or a comet.

7. The moving object detection method according to claim 1, wherein said observation pictures are pictures of the same observation region captured by a CCD camera.

* * * * *